United States Patent
Bezat (10) Patent No.: US 9,016,065 B2
(45) Date of Patent: Apr. 28, 2015

(54) COIL ARRANGEMENT FOR AIR INTAKE SYSTEM FOR GAS TURBINE AND METHODS

(75) Inventor: Theodore Philip Bezat, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 981 days.

(21) Appl. No.: 13/026,801

(22) Filed: Feb. 14, 2011

(65) Prior Publication Data

US 2011/0197592 A1 Aug. 18, 2011

Related U.S. Application Data

(60) Provisional application No. 61/304,602, filed on Feb. 15, 2010.

(51) Int. Cl.
| | |
|---|---|
| F02C 7/08 | (2006.01) |
| F02C 7/143 | (2006.01) |
| F02C 7/047 | (2006.01) |
| F02C 7/055 | (2006.01) |
| F28F 13/14 | (2006.01) |

(52) U.S. Cl.
CPC ............. *F02C 7/143* (2013.01); *F02C 7/047* (2013.01); *F02C 7/055* (2013.01); *F28F 13/14* (2013.01); *F05D 2230/80* (2013.01); *F05D 2260/22141* (2013.01); *F05D 2260/208* (2013.01)

(58) Field of Classification Search
CPC ............. F02C 7/143; F02C 7/047; F02C 7/04; F28F 2215/04

USPC .......... 60/39.092, 39.093, 728, 730; 415/177; 95/273

See application file for complete search history.

(56) References Cited

U.S. PATENT DOCUMENTS

| | | | | |
|---|---|---|---|---|
| 5,669,217 | A | * | 9/1997 | Anderson .................. 60/775 |
| 6,123,751 | A | | 9/2000 | Nelson et al. |
| 6,206,348 | B1 | | 3/2001 | Imsdahl et al. |
| 6,412,291 | B1 | * | 7/2002 | Erickson .................. 62/87 |
| 7,297,173 | B2 | | 11/2007 | Renwart et al. |

(Continued)

FOREIGN PATENT DOCUMENTS

| | | |
|---|---|---|
| EP | 0 334 683 A2 | 9/1989 |
| GB | 1 481 310 | 7/1977 |
| WO | WO 2008/072260 A1 | 6/2008 |

OTHER PUBLICATIONS

Cooling Inlet Air Improves Turbine Output, 4 pages (Jun. 2005).

(Continued)

*Primary Examiner* — Phutthiwat Wongwian
*Assistant Examiner* — Steven Sutherland
(74) *Attorney, Agent, or Firm* — Merchant & Gould P.C.

(57) ABSTRACT

An air intake system for a gas turbine includes one or more coils in airflow communication with an inlet arrangement. Each coil is constructed and arranged to have a respective upstream face velocity that is intended to be within 20% of the other coils. Each coil utilizes a working fluid of a predetermined temperature range conveyed there through and a plurality of spaced fins. The fins are spaced apart to permit air to flow between adjacent fins as air flows through the coil. At least one of the coils has a number of fins per inch that is different from the number of fins per inch of the other coils. Alternatively, each individual coil has at least one section with fewer or greater numbers of fins per inch that the other sections of that coil.

28 Claims, 8 Drawing Sheets

(56) References Cited

U.S. PATENT DOCUMENTS

2008/0298957 A1    12/2008  Chillar et al.
2009/0282836 A1*   11/2009  Mak ............................ 60/783
2009/0288440 A1*   11/2009  Yanik et al. ................. 62/324.1

OTHER PUBLICATIONS

Inlet Air Cooling, 4 pages (Jan. 2008).
International Search Report and Written Opinion mailed Sep. 6, 2011.

* cited by examiner

COIL ARRANGEMENT FOR AIR INTAKE SYSTEM FOR GAS TURBINE AND METHODS

CROSS REFERENCE TO RELATED APPLICATIONS

This application claims the benefit of U.S. Provisional Patent Application Ser. No. 61/304,602, filed Feb. 15, 2010, which application is hereby incorporated by reference in its entirety.

TECHNICAL FIELD

This disclosure relates to an air intake system for a gas turbine. In particular, this disclosure describes an improved heating or chilling coil arrangement for use in an air intake system for a gas turbine and methods.

BACKGROUND

Gas turbines are typically constant-volume machines. At operating speed, they draw a constant volume of air through their compressor section. If the air is more dense, the same volume will contain a higher mass, so the turbine draws a higher mass flow. Cooling the air makes it denser, so the turbine runs with a higher mass flow and produces more power. In some environments, however, the air is too cold and needs to be warmed up for use by the turbine. In yet another application, the air is too close to freezing temperatures while simultaneously high in humidity, and must be warmed to reduce the risk of bellmouth icing.

The coils can be used to either cool or heat the air. When cooling, each coil is also referred to as a cooling coil. When heating, it may be referred to as a heating coil.

Gas turbine air inlet systems have employed systems to affect the temperature of the air before being conveyed to the turbine. Typically, these systems utilize coils downstream of the filtration system. Cooling coils cool the air sometimes to a temperature below the dew point of the air and will produce almost completely saturated air. Downstream of the cooling coils are systems that prevent the condensate from the coils entering the air as droplets, which is known as carry-over. Heating coils warm the air, reducing its relative humidity.

Air intake systems for gas turbines often have a non-symmetrical transition outlet from the air intake to the air flow duct that leads to the power plant. Improvements are desired.

SUMMARY OF THE DISCLOSURE

An air intake system for a gas turbine includes a plurality of coils in airflow communication with an inlet arrangement. Each coil is constructed and arranged to have a respective upstream face velocity that is intended to be within 20% of the face velocity of the other coils.

Each coil utilizes a working fluid of a predetermined temperature range conveyed therethrough and a plurality of spaced fins. The fins are spaced apart to permit air to flow between adjacent fins as air flows through the coil. At least one of the coils has a number of fins per inch that is different from the number of fins per inch of the other coils.

In one implementation, the coils are arranged in a vertical array from a top of the air intake system to a bottom of the air intake system. A coil at the top of the air intake system will have a different number of fins per inch than a coil at the bottom of the air intake system.

The coils may be either upstream or downstream of the inlet arrangement.

In another aspect, a method of changing the heat content of air for a gas turbine includes taking in air through an inlet arrangement. The air will be conveyed through spaced fins in a plurality of coils that are in airflow communication with the inlet arrangement to affect the heat content of the air. At least one of the coils has a number of fins per inch that is different from the number of fins per inch of the other coils. There is further a step of conveying the air to an outlet duct for use by the gas turbine. The coils can be either upstream or downstream of the inlet arrangement.

In one example, a method of using coils, each of which contains areas of differing fin-pack density, is applied. The coils may be constructed using typical coil assembly methods, but differ in that the fin-pack density is not uniform throughout the finned length of the coil, but changes in steps determined by the air flow path of the system to which it is applied. Higher fin-pack density is used in areas which would otherwise experience high air flow velocities, and lower fin-pack density is used in areas which would otherwise experience low air flow velocities.

In another aspect, a method of retrofitting an air intake system for a gas turbine is provided. The air intake system includes an air inlet arrangement for holding a filtration system, an outlet duct downstream of the filtration system, and an outlet transition duct between the filtration system and the outlet duct. The outlet duct has a central axis that may not be in alignment with a central axis of the filtration system. The method includes inserting one or more (e.g., one or a plurality of) coils in airflow communication with the air inlet arrangement and upstream of the outlet transition duct. Each coil utilizes a working fluid of a predetermined temperature range conveyed therethrough and a plurality of spaced fins. The fins are spaced apart to permit air to flow between adjacent fins as air flows through the coil. At least one of the coils has a number of fins per inch that is different from the number of fins per inch of the other coils.

In one method, there is a step of arranging the coils so that, in operation, air from each coil has a respective upstream face velocity that is intended to be within 20% of the face velocity of the other coils.

The coils can be arranged either upstream or downstream of the inlet arrangement.

It is noted that not all the specific features described herein need to be incorporated in an arrangement for the arrangement to have some selected advantage according to the present disclosure.

DETAILED DESCRIPTION

A. Problems with Existing Arrangements

The outlet transition geometry leading from the air intake system to the outlet duct is often not suitable for heating or chiller coil systems. Heating or chiller coil systems, typically chiller systems to cool the air, will have variations in velocity at their faces because of poor flow distribution. These variations then lead to different outlet temperatures, which can exceed the system specifications for uniformity of outlet temperatures because there is little mixing downstream. In addition to this, localized variations in coil face velocity may in some cases greatly exacerbate the tendency of the coil fins to shed water droplets into the air stream ("carry-over", or "drift"). In the past, some ways to address these problems have included using symmetrical outlet transitions, but this increases the length of the vertical ducting required, adding significant cost, or longer outlet transition regions, but this solution also adds significant cost. Another solution used in the past is providing perforated plates near the outlet areas of the coils. This solution, however, adds to the overall pressure drop across the system, which is undesirable.

What is needed is a system that results in uniform velocity profiles, uniform outlet temperatures, and minimal impact on the overall system pressure drop.

B. Solutions to the Problem and FIGS. 1-10

Each coil utilizes a plurality of fins. In the past, all of the individual coils within the coil bank comprising the heater or chiller coil system have typically used the same number of fins per inch. If one can achieve uniform velocity profiles, this will result in uniform outlet temperatures. If one can do this with little impact on system pressure drop, then this is a desirable outcome. By adjusting the number of fins per inch in the individual coils, the individual coils can be arranged in the air intake system to result in uniform face velocities and achieve a uniform outlet temperature without an impact on the pressure drop. That is, in regions of the chiller system that have greater velocity, the number of fins per inch is increased, and in areas of the chiller system where the face velocity is low, the number of fins per inch is decreased. These coils are then arranged to result in uniform velocity profiles across the overall chiller system.

Figure 1:
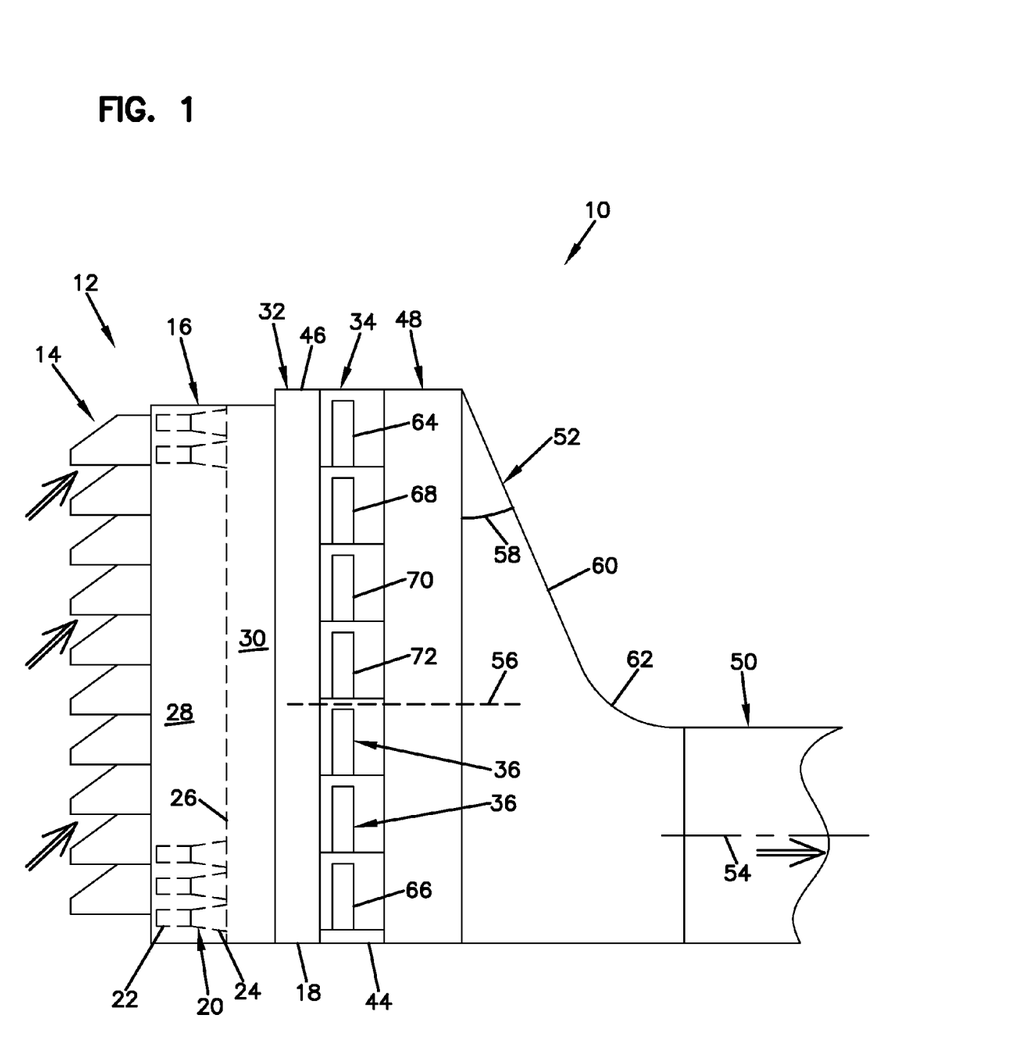
FIG. 1 is a schematic, side view of a first embodiment of an air intake system for a gas turbine, constructed in accordance with principles of this disclosure.

FIG. 1 shows a first embodiment of an air intake system 10 for a gas turbine. The air intake system 10 includes an inlet arrangement 12 oriented to take in air to be used by the gas turbine. In the embodiment shown, the inlet arrangement 12 includes a plurality of inlet hoods 14 and a filtration system 16. The air intake system 10 generally includes an access module 18 and drift module 48 that supports and holds the coils and other components, such as the drift eliminator elements and drain pans.

The filtration system 16 can include various types of air filters utilized to remove debris or dust or other particulate from the air stream before the air is directed into the gas turbine. In the embodiment shown, the filtration system 16 shows in phantom lines filter elements 20 in the form of a cylindrical element 22 axially against a conical element 24. In one non-limiting example, the filter elements 20 can be elements made from pleated cellulose. Suitable elements may be obtained from Donaldson Company, Bloomington, Minn., the assignee of the present disclosure. The filter elements 20 are arranged against a tube sheet 26. Typically, the elements 20 are sealed against the tube sheet 26, such that the filter elements are mounted within a dirty air volume 28, while air on the other side of the tube sheet 26 is a clean air volume 30. The filter elements separate the dirty air volume 28 from the clean air volume 30.

In other embodiments, the elements 20 can be elements made of z-media, such as elements described in U.S. Pat. No. 7,282,075, incorporated herein by reference in its entirety.

Downstream of the filtration system 16 is access module 18. The access module 18 includes framework and provides room and support for a person to be able to access the upstream side of the coils for servicing. Typically, the access module 18 will include supports or other provision to allow the insertion of items such as scaffolding to be used to provide platforms from which to access the upstream side of the individual coils.

In airflow communication with the filtration system 16 is a coil arrangement 34. In this embodiment, the coil arrangement 34 is shown to be downstream of the filtration system 16. The coil arrangement 34 is constructed and arranged to affect the amount of heat in the air (either by cooling the temperature or increasing the temperature) of the air as it passes from the intake arrangement 12 to the downstream gas turbine. The coil arrangement includes a plurality of coils 36. The coils 36, in this embodiment, are downstream of the inlet arrangement 12 and constructed and arranged to receive air from the inlet arrangement 12 and affect the temperature of the air.

Figure 2:
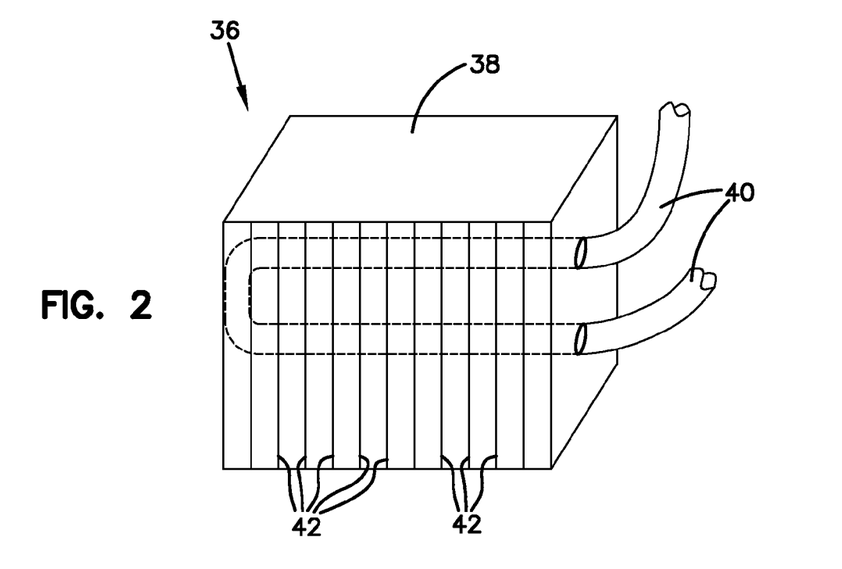
FIG. 2 is a schematic, perspective view of one embodiment of a coil utilized in the air intake system of FIG. 1.
Figure 3:
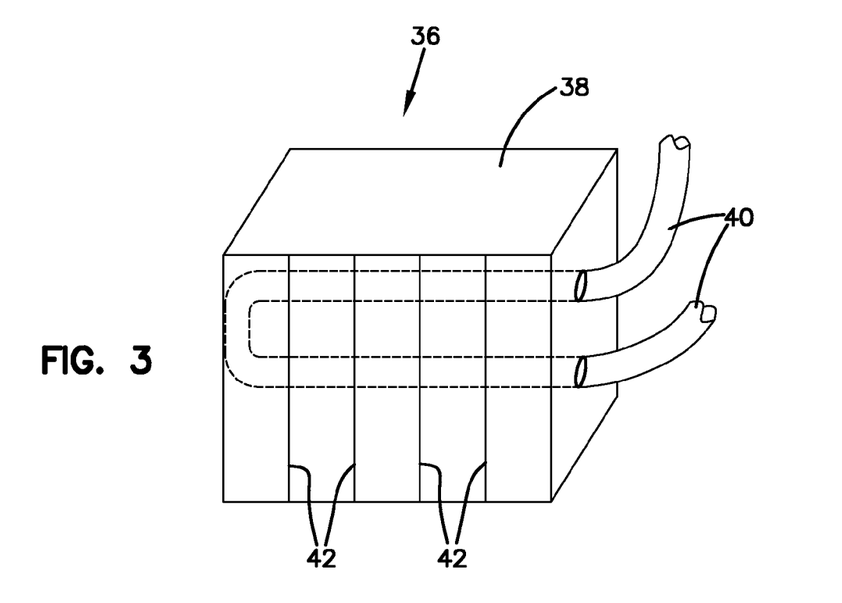
FIG. 3 is a schematic, perspective view of another embodiment of a coil utilized in the air intake system of FIG. 1.

In one embodiment, each coil 36 utilizes a working fluid of a predetermined temperature range conveyed there through. Attention is directed to FIGS. 2 and 3. An example embodiments of a coil is shown at 36. In this embodiment, the coils 36 include a frame 38 having tubing 40 being held by and extending through the frame 38. The frame 38, in this embodiment, is shown schematically as a rectangular box-shape. The tubing 40 is shown schematically, and will be in fluid communication with other equipment to convey the working fluid therethrough. For example, the working fluid can be water, with appropriate antifreeze, which is held and controlled in a storage tank and a pump. Working fluid mixtures may include, but are not limited to, mixtures of water with:

Inhibited ethylene glycol solutions
Inhibited propylene glycol solutions
Inhibited formic acid solutions
Inhibited alcohol solutions In this context, "inhibited" refers to packaged solutions of commercially-available corrosion inhibitors to prevent corrosion on the interiors of the coil tubing. The working fluid is not required to contain these inhibitors, but they are known to the art.

While only a single tube is shown, it is typical to have multiple tubes through which the working fluid is routed through the individual coils.

The working fluid is conveyed through the tubing 40 through each of the coils 36. The working fluid will typically have a controlled predetermined temperature range, depending upon the desired effect on the incoming air. The working fluid, with its predetermined temperature range, is conveyed through the tubing 40, to allow the coil 36 to have the amount of heat it conveys be changed.

In particular, in this embodiment, each coil 36 includes a plurality of spaced fins 42. The fins 42 are held within the frame 38 of the coils 36. The fins 42 are spaced apart relative to each other to permit air to flow between adjacent fins 42 as air passes through the coil 36. Typically, the tubing 40 is in contact with the fins 42, and as working fluid is conveyed through the pipe 40, it will affect the temperature of the fins 42. The temperature of the fins 42 will affect the amount of heat in the air stream as it passes between the fins 42. The number of fins 42 per inch has a significant effect on both the heat transferred from the coil 36 to the air, and on the pressure drop experienced by the air passing through the coil 36.

In accordance with principles of this disclosure, there are one or more (a plurality of) coils 36 in the air intake system 10. At least one of the coils 36 has a number of fins 42 per inch that is different from the number of fins 42 per inch of the other coils 36. Alternatively, one or more of the coils may have a fin density which varies in segments within the single coil(s) 36; or a combination of these two different coil configurations may be used. Among other advantages, by having a different number of fins 42 per inch in the coils 36, the upstream face velocity as it enters each coil 36 can be evened out, such that the respective face velocity of each coil 36 can be within 20% of every other coil 36. This helps to achieve the uniform outlet temperature, without an impact on the overall pressure drop across the air intake system 10.

Comparing FIGS. 2 and 3, it can be seen how the coil 36 in FIG. 2 has more fins 42 per inch than the coil 36 in FIG. 3. In many example embodiments, each coil 36 ranges about 5-7 feet tall and up to 360 inches in length; additional sizes are possible. Typically, there are about 8 fins per inch, in a standard coil 36. When applying principles of this disclosure, the density of the fins 42 will typically be between 4 and 11 fins per inch.

In reference again to FIG. 1, in this embodiment, the coils 36 are arranged in a vertical array, with one coil 36 on top of another, as the air intake system 10 goes from a bottom 44 of the air intake system 10 to a top 46 of the air intake system 10. The fins 42 extend vertically in the air intake system 10. Other embodiments are possible, and will be described further below.

In the embodiment of FIG. 1, downstream of the coil arrangement 34 are drift modules 48. The term "drift" refers to moisture that is carried by the air in the form of droplets. The drift modules 48 help to prevent carryover in the form of water droplets from reaching the gas turbine. Such drift modules are known in the art. If velocity through the air intake system 10 is too high, then the water droplets are more apt to make it through the air intake system to the gas turbine. The coils 36, by controlling the velocity of the air, also helps to reduce the carryover in the form of water droplets.

Still in reference to FIG. 1, an outlet duct 50 is downstream of the coil arrangement 34 and is oriented to direct the air from the coils 36 to the gas turbine. In the embodiment shown, the outlet duct 50 extends between an outlet transition duct 52 and the drift modules 48. In the embodiment shown, the outlet duct 50 has a central axis 54 that is not in alignment (is misaligned) with a central axis 56 of the coil arrangement 34. That is, the outlet duct 50 is asymmetric with respect to the overall air intake system 10. Because of the asymmetry, if the coils 36 are not adjusted to have variable fin pack densities, then the velocity and air outlet temperature through the air intake system 10 would vary. Specifically, the velocity through the air intake system 10 would be greatest near the bottom 44, which is in alignment with the outlet duct 50, and the velocity would be the least near the top 46, which is out of alignment with the outlet duct 50.

As can be seen in FIG. 1, the outlet transition region 52 is sloped, extending at an acute angle 58 from the framework 18, until reaching the outlet duct 50. Between the sloped region 60 and the outlet duct 50, in this embodiment, is a curved region 62 (which is typical but not required). While various geometries are possible, depending upon the particular air intake system 10, the angle 58 of the sloped region 60 will be less than 90 degrees, and more typically less than 45 degrees. The smaller the angle 58, the greater the variance in velocity across the coil arrangement 34.

In the embodiment of FIG. 1, the transition duct 52 is biased in a direction toward the bottom 44 of the air intake system 10. In such an arrangement, the coil 64 at the top 46 of the air intake system 10 has fewer fins 42 per inch than a coil 66 at the bottom 44 of the air intake system 10. Preferably, the top coil 64 will have fewer fins per inch than any other coil 36 in the air intake system 10. In many implementations, each coil 36 will have fewer fins 42 per inch than a next adjacent coil 36 below it. For example, typically the coil 68 that is adjacent to and below the top coil 64 will have more fins 42 per inch than the top coil 64. The coil 68 will typically have fewer fins per inch than the next adjacent coils 70, which is right below the coil 68.

In one non-limiting example, it was found useful that the coil 64 at the top of the air intake system 10 have no more than 5 fins per inch. It was also found that the bottom coil 66 has at least 10 fins per inch. In this arrangement, it was also found that the coils 36 between the top module 64 and the bottom module 66 have between 5 and 10 fins per inch.

Figure 4:
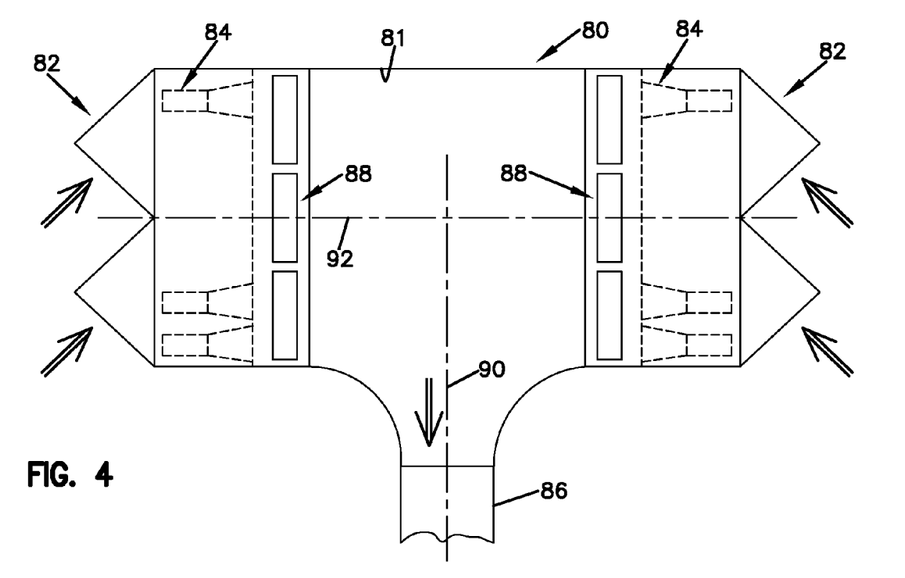
FIG. 4 is a schematic, side view of another embodiment of an air intake system, constructed in accordance with principles of this disclosure.
Figure 5:
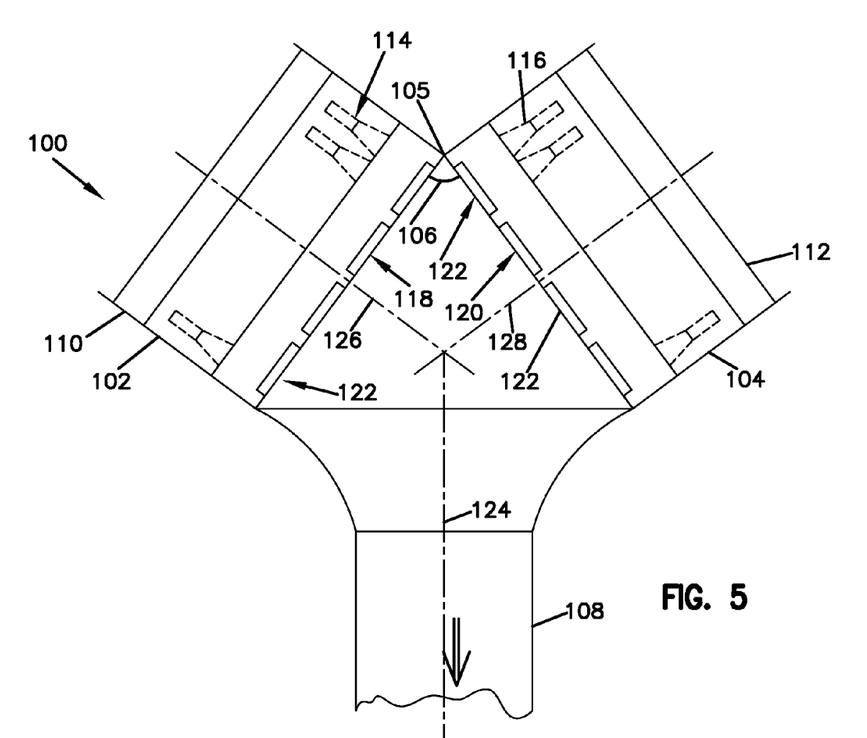
FIG. 5 is a schematic, top view of another embodiment of an air intake system, constructed in accordance with principles of this disclosure.
Figure 6:
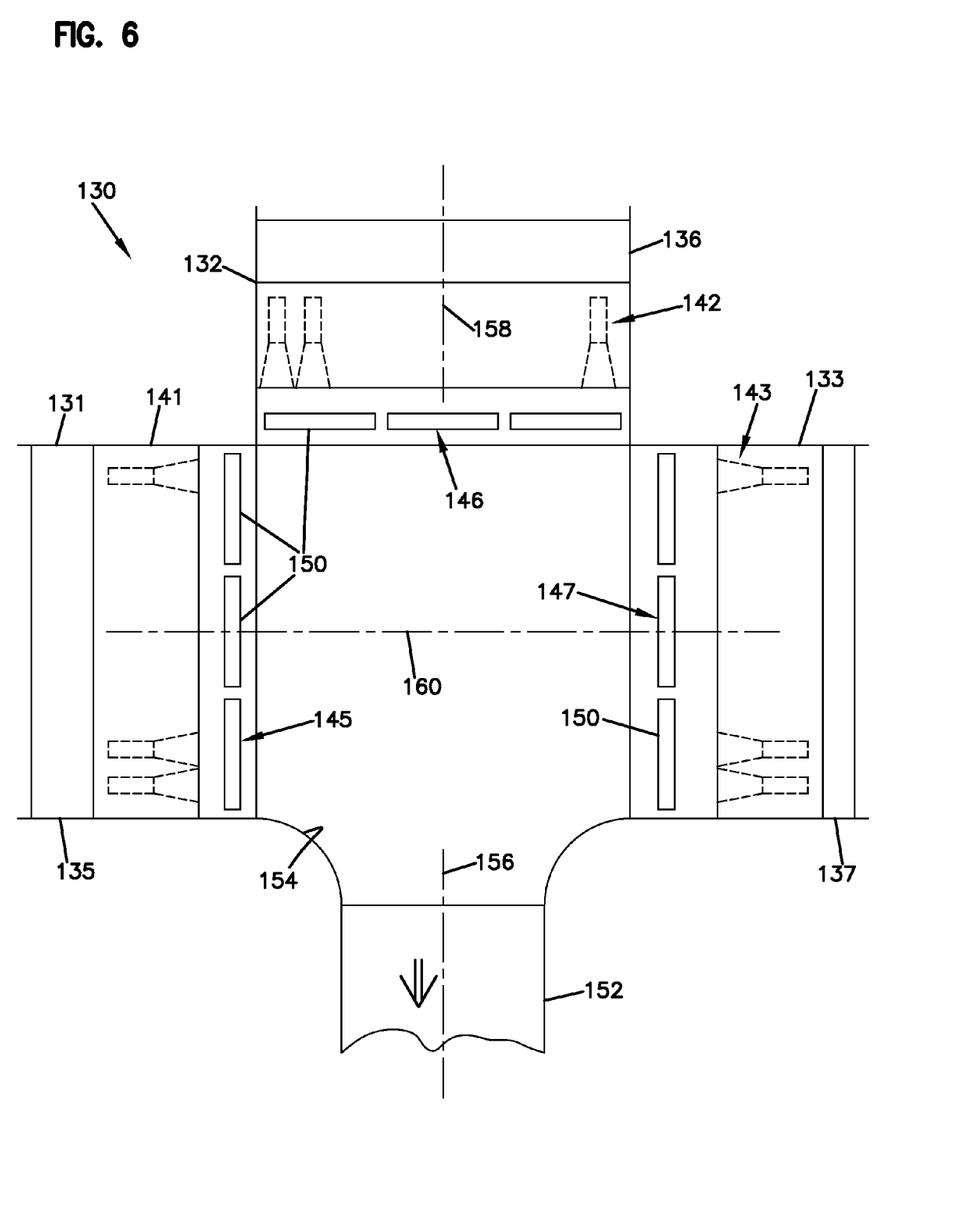
FIG. 6 is a schematic, top view of another embodiment of an air intake system for a gas turbine, constructed in accordance with principles of this disclosure.

FIGS. 4-6 show other embodiments of air intake systems, utilizing coils having different fin pack densities. In FIG. 4, an air intake system 80 is shown in side elevation view. Hoods 82 show where air is taken in to the system 80. As can be seen in FIG. 4, there are two sides to the air intake system 80, both leading into a central clean air duct 81. The clean air duct 81 leads to the outlet duct 86.

Downstream of each of the two arrangements of hoods 82 are two arrangements of filtration systems 84. Downstream of each of the filtration systems 84 is an arrangement of coils 88. Although shown downstream of the filtration systems 84, the coils 88 could also be upstream of the filtration systems 84. The coils 88 are as described above. There will be at least one coil 88 that has a number of fins per inch that is different from the number of fins per inch of the other coils 88. As can be seen in FIG. 4, the coils 88 are in two vertical arrays, opposing each other and separated by the clean air duct 81 with the outlet duct 86 extending therethrough. A central axis 90 of the outlet duct 86 intersects a central axis 92 of the two arrays of coils 88. In this embodiment, the axis 90 is generally perpendicular to the axis 92.

One of the objectives will be to have each coil 88 to have an upstream face velocity that is intended to be within 20% of the upstream face velocities of the other coils 88. In the arrangement of FIG. 4, in general, if the number of fins 42 per inch in each coil 88 is kept the same, the face velocity would be greatest at the region nearest the outlet duct 86, and lowest at the upper coils in the system. Thus, in the embodiment of FIG. 4, the modules 88 that have the greatest velocity will have more fins 42 per inch than the modules 88 that normally would have less velocity, to result in a more even face velocity across each of the modules 88.

FIG. 5 shows a top view of another embodiment of an air intake system 100. In this embodiment, there is a two sided inlet, with a first inlet 102 and a second inlet 104. The first and second inlets 102, 104 are angled relative to each other at angle 106. Opposite of where the first and second inlets 102, 104 intersect at an apex 105 and are joined at angle 106 is an outlet duct 108.

In this embodiment, each of the inlets 102, 104 has hoods 110, 112 and a filtration system 114, 116, as previously described.

Downstream of each filtration system 114, 116 is a coil arrangement 118, 120, as previously described. Although shown downstream of the filtration systems 114, 116, the coils 88 could also be upstream of the filtration systems 114, 116. The heat module arrangements 118, 120 include a plurality of coils 122. At least one of the coils 122 has a number of fins that is different from the number of fins of the other coils 122.

The outlet duct 108 has a central axis 124 that intersects a central axis 126 of the coil 118 and the central axis 128 of the coil arrangement 120. The axis 126 of the coil arrangement 118 intersects with the axis 128 of the coil arrangement 120. This type of arrangement can lead to uneven flow velocities in that modules 118, 120 nearest the duct 108 will have greater face velocities than modules 118, 120 nearest the apex 105, so by adjusting the density of the fins in each of the coils 122, the upstream face velocity of each coil 122 can be within 20% of the upstream face velocity of the other coils 122.

FIG. 6 shows an embodiment of a three-sided inlet for an air intake system 130. FIG. 6 shows a top view of the air intake system 130.

In FIG. 6, there is a first, second, and third inlet arrangement 131, 132, 133. Each of the inlet arrangements 131, 132, and 133 has components and equipment as previously described including inlet hoods 135, 136, and 137. Downstream of each of the hoods is a filtration system 141, 142, and 143. Downstream of each of the filtration systems is a coil arrangement 145, 146, 147. Although shown downstream of the filtration systems 141, 142, 143, the coils 145, 146, 147 could also be upstream of the filtration systems 141, 142, 143.

Each of the coil arrangements includes a plurality of coils 150.

An outlet duct 152 leads from a clean air volume 154. The clean air volume 154 is downstream of each of the first, second, and third inlet arrangements 131, 132, and 133. In this embodiment shown, the outlet duct 152 has a central axis 156 that is generally in alignment with a central axis 158 of the coil arrangement 146 for the second inlet arrangement 132. The coil arrangement 145 for the first inlet arrangement 131 and the coil arrangement 147 for the third inlet arrangement 133, in this embodiment, share a common central axis 160. This axis 160 intersects the axis 156 and 158. In the embodiment shown, the axis 160 is generally perpendicular to the axis 156, 158.

In this arrangement, at least one of the coils 150 has a number of fins per inch that is different from the other modules 150. Preferably, each coil 150 has a respective upstream face velocity that is intended to be within 20% of the upstream face velocity of the other coils 150. Without adjusting the fin density in the coils 150, the coils 150 located in the regions nearest to the outlet duct 152 would have greater velocities than the other coils 150.

Figure 7:
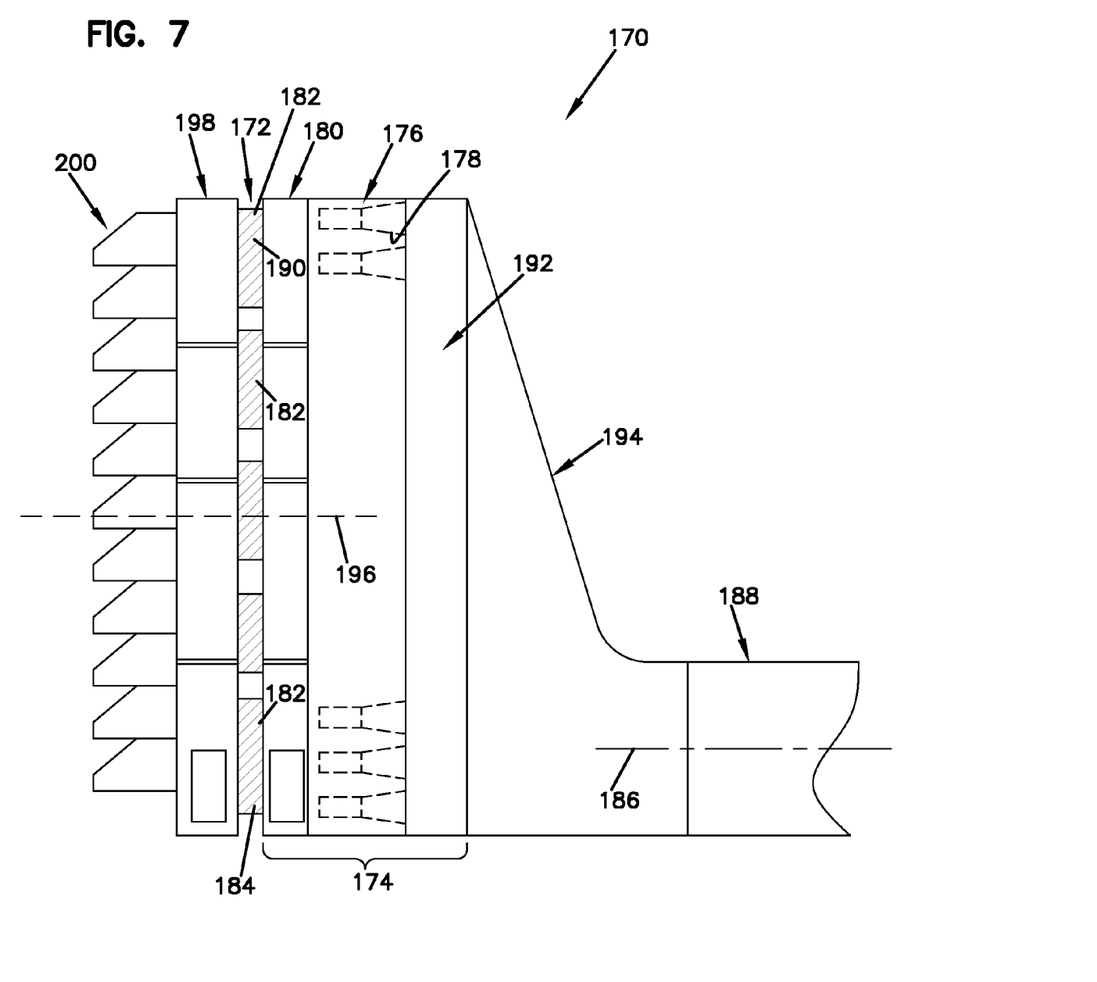
FIG. 7 is a schematic, side view of another embodiment of an air intake system, constructed in accordance with principles of this disclosure.

FIG. 7 shows another embodiment of an air intake system 170. System 170 is similar to system 10 of FIG. 1, except that in this embodiment, the coil arrangement 172 is upstream of the inlet arrangement 174.

The inlet arrangement 174 includes a filtration systems 176, which may include filter elements 178. Between the coil arrangement 172 and the filtration system 176, in this embodiment, is depicted a filter element access walkway 180. The walkway 180 allows access to the filtration system 176, in order to allow for servicing, such as changing out and replacing the filter elements 178.

The coil arrangement 172 includes a plurality of coils 182, such as described above. Each of the coils 182 includes a number of fins per inch. At least one of the coils 182 has a number of fins per inch that is different from the other coils 182. As with the embodiment of FIG. 1, preferably each coil 182 has a respective upstream face velocity that is intended to be within 20% of the upstream face velocity of the other coils 182.

In the embodiment of FIG. 7, the coil 182 at location 184, which is the location located in alignment with a central axis 186 of the outlet duct 188 would have the most number of fins per inch (the greatest fin density). The coil 182 located at 190, which is the uppermost coil 182, would have the fewest number of fins per inch (the least fin density).

In FIG. 7, downstream of the filtration system 176 is a clean air plenum 192. Leading from the clean air plenum 192 to the outlet duct 188 is an outlet transition 194. The outlet transition is sloped. Without adjusting the fin density in the coils 182, the coils 182 located nearest the outlet duct 188 would have greater velocities than the other coils 182. As can be seen in FIG. 7, the central axis 196 passing through the coil arrangement 172 is misaligned and parallel to the central axis 186 of the outlet duct 188.

Upstream of the coil arrangement 172 are modules 198 to provide hood support and coil access. Upstream of the modules 198 are inlet hoods 200.

In use, air flows through the inlet hoods 200, through the modules 198, and then to the coil arrangement 172. The amount of heat content in the air is affected by the coils 182 in the coil arrangement 172. The upstream velocity of each coil is intended to be within about 20% of each other. The coil arrangement 172 will either cool the air, or heat up the air, depending upon the desired effect. From the coil arrangement 172, the air will flow through the inlet arrangement 174 having the filtration system 176. There, the air is filtered of dust or other debris. The filtered air is then conveyed through the clean air plenum 192, into the outlet transition 94, and then through the outlet duct 188. From there, the air is conveyed into the gas turbine.

Figure 8:
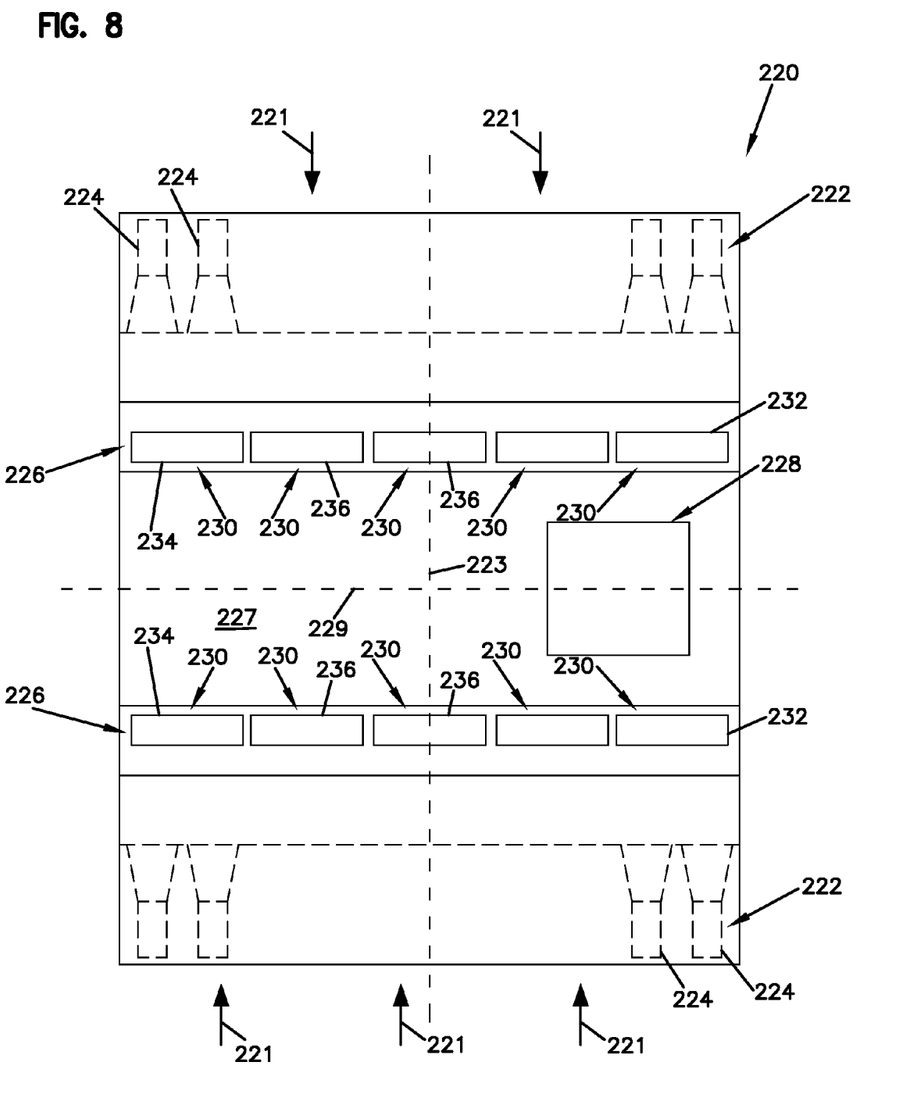
FIG. 8 is a schematic, top view of another embodiment of an air intake system for a gas turbine, constructed in accordance with principles of this disclosure.

FIG. 8 shows a top view of another embodiment of an air intake system 220. The inlet arrangement includes a filtration system 222, which may include filter elements 224. Upstream of the filtration system will typically be a walkway, which may support hoods or other inlet treatment (not shown). Air flow is shown at arrows 221, being directed into the filtration system 222, in a general direction parallel to axis 223. A coil arrangement 226 is shown downstream of the filtration system 222, just before an air outlet area 227, also referred to as plenum 227. Axis 229 runs centrally through plenum 227 and is perpendicular to axis 223. The plenum 227 includes an outlet duct 228, through which the air is drawn vertically (into the plane of the illustration). This outlet duct 228 may be located asymmetrically, or may by symmetrically located within the plenum 227.

The coil arrangement 226 includes a plurality of coils 230, such as described above. Each of the coils 230 includes a number of fins per inch. At least one of the coils 230 has a number of fins per inch that is different from the other coils 230. As with the embodiment of FIG. 1, preferably each coil 230 has a respective upstream face velocity that is intended to be within 20% of the upstream face velocity of the other coils 230. In this embodiment, the coils 230 are arranged vertically (with the coil tubing running vertically, and the fins being horizontal).

In the embodiment of FIG. 8, the coil 232 located closest in alignment with a central axis of the outlet duct 228 has the most number of fins per inch (the greatest fin density). The coil 234 located farthest from the outlet duct 228 has the fewest number of fins per inch (the least fin density). The coils 236 in between coils 234 and 232 will preferably have an intermediate fin density.

Without adjusting the fin density in the coils, the coils 232 located nearest the outlet duct 228 would have greater velocities than the other coils. As can be seen in FIG. 8, the central axis of the outlet 228 is aligned only with the coils 232 immediately in front of it, while the coils 234, 236 not immediately in front of the outlet are misaligned with the outlet duct.

In use, air flows through the inlet hoods (or other treatment), through the filtration system 222. There, the air is filtered of dust or other debris, and then flows to the coil arrangement 226. The amount of heat content in the air is affected by the coils in the coil arrangement 226. The upstream velocity of each coil is intended to be within about 20% of each other. The coil arrangement 226 will either cool or heat the air, depending upon the desired effect. From the coil arrangement 226, the air will flow through the clean-air plenum 227 and into the outlet duct 228. From there, the air is conveyed into the gas turbine.

Figure 9:
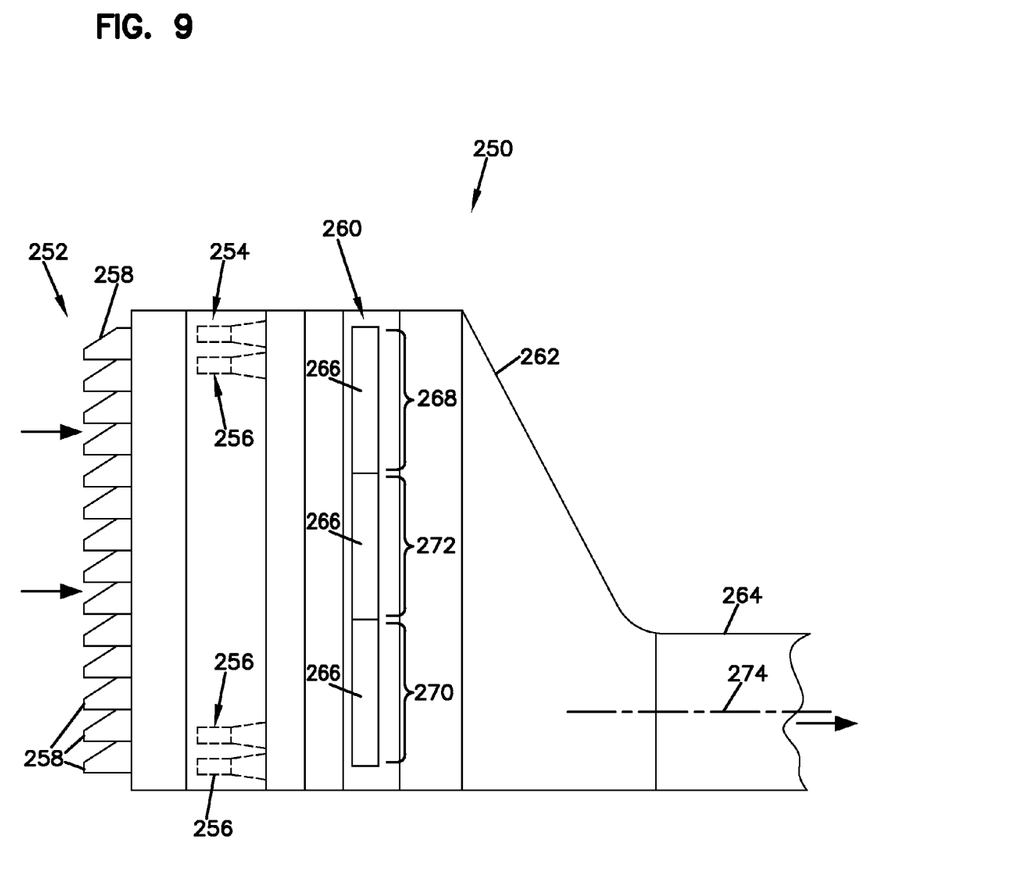
FIG. 9 is a schematic, side view of another embodiment of an air intake system for a gas turbine, constructed in accordance with principles of this disclosure.

FIG. 9 shows a side view of another embodiment of an air intake system 250. The inlet arrangement 252 includes a filtration system 254, which may include filter elements 256. Upstream of the filtration system 254 will typically be a walkway, which may support hoods 258 or other inlet treatment. A coil arrangement 260 is shown downstream of the filtration system 254, just before the air outlet area 262, (referred to as an "outlet transition 262"). The outlet transition 262 is connected to an outlet duct 264, through which the air is drawn horizontally. This outlet duct 264 may be located asymmetrically, or may be symmetrically located behind the outlet transition 262.

The coil arrangement 260 includes a plurality of coils 266, such as described above. Each of the coils 266 includes a number of fins per inch. In this embodiment, each individual coil 266 within the width of the inlet system has sections which are of different fin-pack density. As with the embodiment of FIG. 1, preferably each coil 266 has a respective upstream face velocity that is intended to be within 20% of the upstream face velocity of the other coils. In this embodiment, the coils 266 are arranged vertically, with the coil tubing running vertically, and the fins being horizontal.

In the embodiment of FIG. 9, the section 268 of the coil arrangement 260 located at the top of the illustration, which is the location located farthest from alignment with a central axis 274 of the outlet duct 264 has the fewest number of fins per inch (the lowest fin density). The section 270 of the coil arrangement 260 located at the bottom, which is the lowermost portion of the coil arrangement 260, would have the greatest number of fins per inch (the highest fin density). The section 272 of the coil arrangement 260 located in between sections 268 and 270 has an intermediate number of fins per inch.

Without adjusting the fin density in the coils, the section 270 of the coil arrangement 260 located nearest the outlet duct 264 would have greater velocities than the other sections 268, 272. As can be seen in FIG. 9, the central axis 274 of the clean-air plenum outlet 264 is aligned only with the section 270 of coils 266 immediately in front of it, while the sections 272, 268 of the coils 266 not immediately in front of the outlet 264 are misaligned with the outlet duct 264.

In use, air flows through the inlet hoods 258 (or other treatment), through the filtration system 254. There, the air is filtered of dust or other debris, and then flows to the coil arrangement 260. The amount of heat content in the air is affected by the coils 266 in the coil arrangement 260. The upstream velocity of each coil is intended to be within about 20% of each other. The coil arrangement 260 will either cool or heat the air, depending upon the desired effect. From the coil arrangement 260, the air will flow through the outlet transition 262 and into the outlet duct 264. From there, the air is conveyed into the gas turbine.

Figure 10:
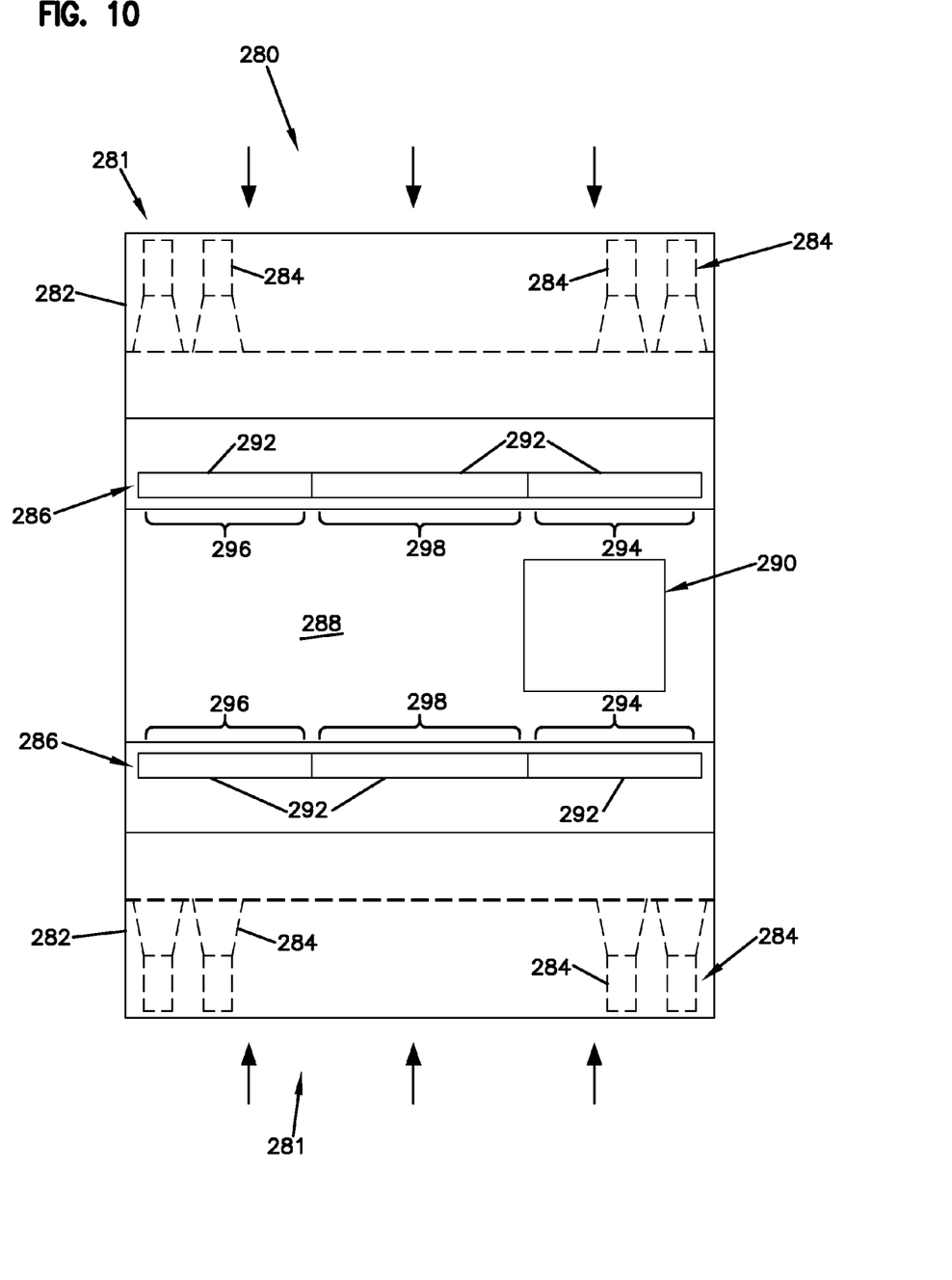
FIG. 10 is a schematic, top view of another embodiment of an air intake system for a gas turbine, constructed in accordance with principles of this disclosure.

FIG. 10 shows a top view of another embodiment of an air intake system 280. The inlet arrangement 281 includes a filtration system 282, which may include filter elements 284. Upstream of the filtration system will typically be a walkway, which may support hoods or other inlet treatment (not shown). The coil arrangement 286 is shown downstream of the filtration system 282, just before the air outlet area 288 (referred to as a "plenum 288"). The plenum 288 includes an outlet duct 290, through which the air is drawn vertically (into the plane of the illustration). This outlet duct 290 may be located asymmetrically, or may by symmetrically located within the plenum 288.

The coil arrangement 286 includes a plurality of coils 292, such as described above. Each of the coils 292 includes a number of fins per inch. Each of the coils 292 has portions with different fin-pack densities. As with the embodiment of FIG. 1, preferably each coil has a respective upstream face velocity that is intended to be within 20% of the upstream face velocity of the other coils. In this embodiment, the coils 292 are arranged horizontally (with the coil tubing running horizontally, and the fins being vertical).

In the embodiment of FIG. 10, the portion or section 294 of the coil arrangement 286 located closest in alignment with a central axis of the outlet duct 290 would have the most number of fins per inch (the greatest fin density). The section 296 of the coil arrangement 286 farthest from the plenum outlet 290 has the fewest number of fins per inch (the least fin density). The section 298 intermediate of section 294 and 296 has an intermediate number of fins per inch.

Without adjusting the fin density in the coils 292, the section 294 of the coil arrangement 286 located nearest the outlet duct would have greater velocities than the other sections 296, 298. As can be seen in FIG. 10, the central axis of the clean-air plenum outlet 290 is aligned only with the section 294 of the coils immediately in front of it, while the sections 296, 298 of the coils not immediately in front of the outlet 290 are misaligned with the outlet duct 290.

In use, air flows through the inlet hoods (or other treatment), through the filtration system 282. There, the air is filtered of dust or other debris, and then flows to the coil arrangement 286. The amount of heat content in the air is affected by the coils in the coil arrangement. The upstream velocity of each coil 292 is intended to be within about 20% of each other. The coil arrangement 286 will either cool or heat the air, depending upon the desired effect. From the coil arrangement 286, the air will flow through the clean-air plenum 288 and into the outlet duct 290. From there, the air is conveyed into the gas turbine.

C. Methods

In general, a method of changing the heat content of air for a gas turbine can be done utilizing principles as described herein. Air is taken in through an inlet arrangement, such as one of the inlet arrangements described above, such as inlet arrangement 12 (FIG. 1)

The air is conveyed through spaced fins in a plurality of coils in airflow communication with the inlet arrangement to affect the heat content of the air. One or more of the coils has a number of fins that is different from the number of fins of the other coils. In another arrangement, each individual coil has sections with a number of fins per inch that is different from other sections of that same coil. The coils can be either downstream of the inlet arrangement or upstream of the inlet arrangement. Next, the air is conveyed to an outlet duct for use by the gas turbine.

The step of taking in air through an inlet arrangement will typically include directing the air through a filtration system, first, to remove at least some debris in the air.

The step of conveying the air through spaced fins includes conveying the air through coils that cool the air. In other methods, the step of conveying air through spaced fins can include conveying air through coils to heat the air.

Typically, the variations in velocity at the upstream or inlet face of each coil cannot be varied more than 20% (although the exact allowable velocity range may vary depending on the criteria for the specific turbine). The temperature of the air leaving the coils cannot be varied more than plus or minus 5 degrees Fahrenheit (again, the exact allowable temperature range may vary depending on the criteria for the specific turbine).

In one preferred method, the step of conveying the air includes shedding fewer droplets of condensed water from downstream edges of the fins as compared to a second air intake system for a gas turbine, operating under the same conditions as the first air intake system, but the second air intake system has coils each having an identical number of fins per inch.

A method of retrofitting an air intake system for a gas turbine can also be implemented according to principles of this disclosure. Typically, the air intake system will include an air inlet arrangement that holds a filtration system. There will be an outlet duct downstream of the filtration system. An outlet transition duct will be between the filtration system and the outlet duct. The outlet duct may have a central axis that is not in alignment with the central axis of the filtration system. The method of retrofitting will include inserting a plurality of coils either upstream or downstream of the air inlet arrangement and upstream of the outlet transition duct. Each coil will utilize a working fluid of a predetermined temperature range conveyed therethrough and a plurality of spaced fins. The fins will be spaced apart to permit air to flow between adjacent fins as air flows through the coil. At least one of the coils will have a number of fins per inch that is different from the number of fins per inch of the other coils, or each coil will have a section or sections with a number of fins per inch that is different from other areas of the coil.

Preferably, the step of inserting one or more coils will include arranging the coil or coils so that, in operation, air from each coil or coils will have a respective upstream face velocity that is within 20% of the other coils, or within the face area of a single coil.

In one embodiment, the step of inserting one or more coils includes arranging the coil or coils in a vertical array from a top of the air intake system to a bottom of the air intake system. The transition duct may be biased in a direction toward the bottom of the air intake system. A coil at the top of the air intake system will have fewer fins than a coil at a bottom of the air intake system. The number of fins will be adjusted such that there will be a gradient in the number of fins per inch in the coils. Alternatively, the transition duct may be biased toward the top of the air intake system, and then a coil at the bottom or the air intake system will have fewer fins than a coil at the top of the air intake system.

In one embodiment, the step of inserting one or more coils will include arranging the coils so that each coil has fewer fins per inch than a next adjacent coil below it.

Factors to consider when retrofitting an air intake system for a gas turbine will include the temperature of the air as it enters the air intake, the temperature of the air as it leaves the air intake, and what type of working fluid is conveyed through the coils. Properties of the coil are considered, including the entering temperature of the working fluid and the flow rate of the working fluid. Consideration such as the air mass flow through the turbine are also included. Considerations of the filtration systems are factored in, include the type of filter utilized, whether the system is static or pulse cleaned, and the pressure drop through the inlet system. The geometry of the transition duct is considered, include the location of the outlet duct and the dimensions of the outlet duct.

The above specification, examples and data provide a description of the manufacture and use of the invention. Many embodiments can be made.

The invention claimed is:

1. An air intake system for a gas turbine; the gas intake system comprising:
   (a) an inlet arrangement oriented to take in air along an airflow path to be used by the gas turbine;
   (b) one or more coils in a first array in airflow communication with the inlet arrangement constructed and arranged to affect the temperature of the air;
       (i) each coil utilizing a working fluid of a predetermined temperature range conveyed therethrough and a plurality of spaced fins;
           (A) the fins being spaced apart to permit air to flow between adjacent fins as air flows through the coil;
       (ii) at least one of the coils in the first array having a number of fins per inch that is different from the number of fins per inch of the other coils in the first array; or alternatively, one or more of the coils in the first array having at least one section with a number or fins per inch that is different from the number of fins per inch in other sections of the coil in the first array; whereby resulting in substantially uniform upstream face velocities of each coil in the first array and a substantially uniform outlet temperature; and
   (c) an outlet duct downstream of both the coils and the inlet arrangement and oriented to direct the air from the coils to the gas turbine; the outlet duct having a central axis, wherein the airflow path through the inlet arrangement is misaligned with the central axis of the outlet duct.

2. An air intake system according to claim 1 wherein:
   (a) each coil has a respective upstream face velocity that is within 20% of the other coils.

3. An air intake system according to claim 1 wherein:
   (a) the coils are upstream of the inlet arrangement.

4. An air intake system according to claim 3 further comprising:
   (a) an outlet transition duct between the inlet arrangement and the outlet duct.

5. An air intake system according to claim 1 wherein:
   (a) the coils are downstream of the inlet arrangement.

6. An air intake system according to claim 5 further comprising:
   (a) an outlet transition duct between the coils and the outlet duct.

7. An air intake system according to claim 6 wherein:
   (a) the coils being in a vertical array from a top of the air intake system to a bottom of the air intake system;
   (b) the transition duct is biased in a direction toward the bottom of the air intake system; and (c) a coil at the top of the air intake system has fewer fins per inch than a coil at the bottom of the air intake system.

8. An air intake system according to claim 7 wherein:
   (a) a coil at the top of the air intake system has fewer fins per inch than any other coil; and
   (b) each coil has fewer fins per inch than a next adjacent coil below it.

9. An air intake system according to claim 7 wherein:
   (a) each coil has fewer fins per inch than a next adjacent coil below it.

10. An air intake system according to claim 1 wherein:
    (a) each coil is one of a cooling coil or a heating coil; and
    (b) the inlet arrangement includes a plurality of filters operably oriented to remove at least some debris from the air.

11. A method of changing the heat content of air for a gas turbine; the method comprising:
    (a) taking in the air through an inlet arrangement along an airflow path;
    (b) conveying the air through spaced fins in one or more coils in a first array in airflow communication with the inlet arrangement to affect the heat content of the air;
        (i) one or more of the coils in the first array having a number of fins per inch that is different from the number of fins of the other coils in the first array; or, alternatively, one or more of the coils in the first array having at least one section with a number or fins per inch that is different from the number of fins per inch in other sections of the coil in the first array; whereby resulting in substantially uniform upstream face velocities of each coil in the first array and a substantially uniform outlet temperature; and
    (c) conveying the heat content affected air to an outlet duct for use by the gas turbine; the outlet duct having a central axis, wherein the airflow path through the inlet arrangement is misaligned with the central axis of the outlet duct.

12. A method according to claim 11 wherein:
    (a) the step of taking in the air through an inlet arrangement occurs before the step of conveying the air through spaced fins in one or more coils.

13. A method according to claim 11 wherein:
    (a) the step of taking in the air through an inlet arrangement occurs after the step of conveying the air through spaced fins in one or more coils.

14. A method according to claim 11 wherein:
    (a) the step of conveying the air through spaced fins includes conveying the air to result in the air from each coil having a respective upstream face velocity that is within 20% of the other coil or coils.

15. A method according to claim 11 wherein:
    (a) the step of conveying the air to an outlet duct includes conveying the air through an outlet transition duct leading to the outlet duct.

16. A method according to claim 11 wherein:
    (a) the step of conveying the air through spaced fins includes conveying the air through coils oriented in a vertical array from a top of the air intake system to a bottom of the air intake system;
        (i) a coil at the top of the air intake system has fewer fins per inch than a coil at the bottom of the air intake system;
    (b) the step of taking in air through an inlet arrangement includes directing the air through a filtration system to remove at least some debris; and
    (c) the step of conveying the air through spaced fins includes conveying the air through a coil or coils that cool the air.

17. A method according to claim 11 wherein:
    (a) the method is conducted in a first air intake system for a gas turbine; and
    (b) the step of conveying the air includes shedding fewer droplets of condensed water from downstream edges of the fins as compared to a second air intake system for a gas turbine, operating under the same conditions as the first air intake system, but the second air intake system having a coil or coils each having an identical number of fins per inch.

18. A method of retrofitting an air intake system for a gas turbine; the air intake system including an air inlet arrangement for holding a filtration system and for taking in air along an airflow path; an outlet duct downstream of the filtration system; and an outlet transition duct between the filtration system and the outlet duct; the outlet duct having a central axis; wherein the airflow path through the inlet arrangement is misaligned with the central axis of the outlet duct;
    the method comprising:
    (a) inserting one or more coils in a first array to be in airflow communication with the air inlet arrangement and upstream of the outlet transition duct;
        (i) each coil utilizing a working fluid of a predetermined temperature range conveyed therethrough and a plurality of spaced fins;
            (A) the fins being spaced apart to permit air to flow between adjacent fins as air flows through the coil;
        (ii) at least one of the coils in the first array having a number of fins per inch that is different from the number of fins per inch of the other coils in the first array; or each coil in the first array has at least one section with fewer or greater fins per inch than other sections of the coil in the first array; whereby resulting in substantially uniform upstream face velocities of each coil in the first array and a substantially uniform outlet temperature.

19. A method of retrofitting according to claim 18 wherein:
    (a) the step of inserting one or more coils includes arranging the coils so that, in operation, air from each coil has a respective upstream face velocity that is within 20% of the other coils;
    (b) the step of inserting one or more coils includes:
        arranging the coils in a vertical array from a top of the air intake system to a bottom of the air intake system;
            (i) the transition duct is biased in a direction toward the bottom of the air intake system; and
            (ii) a coil at the top of the air intake system has fewer fins per inch than a coil at the bottom of the air intake system.

20. A method of retrofitting according to claim 18 wherein:
    (a) the step of inserting one or more coils includes arranging the coils so that each coil has fewer fins per inch than a next adjacent coil.

21. A method of retrofitting according to claim 18 wherein:
    (a) the step of inserting one or more coils includes inserting the one or more coils to be downstream of the air inlet arrangement.

22. A method of retrofitting according to claim 18 wherein:
    (a) the step of inserting one or more coils includes inserting the one or more coils to be upstream of the air inlet arrangement.

23. An air intake system for a gas turbine; the gas intake system comprising:
   (a) an inlet arrangement oriented to take in air to be used by the gas turbine;
   (b) one or more coils in a vertical first array from a top of the air intake system to a bottom of the air intake system in airflow communication with the inlet arrangement constructed and arranged to affect the temperature of the air;
      (i) each coil utilizing a working fluid of a predetermined temperature range conveyed therethrough and a plurality of spaced fins;
         (A) the fins being spaced apart to permit air to flow between adjacent fins as air flows through the coil;
      (ii) at least one of the coils in the first array having a number of fins per inch that is different from the number of fins per inch of the other coils in the first array; or alternatively, one or more of the coils in the first array having at least one section with a number or fins per inch that is different from the number of fins per inch in other sections of the coil;
      (iii) a coil at the top of the air intake system having fewer fins per inch than a coil at the bottom of the air intake system;
   (c) an outlet duct downstream of both the coils and the inlet arrangement and oriented to direct the air from the coils to the gas turbine, wherein an airflow path through the inlet arrangement is misaligned with a central axis of the outlet duct; and
   (d) an outlet transition duct between the one or more coils and the outlet duct;
      (i) the transition duct being biased in a direction toward the bottom of the air intake system.

24. An air intake system according to claim 23 wherein:
   (a) a coil at the top of the air intake system has fewer fins per inch than any other coil; and
   (b) each coil has fewer fins per inch than a next adjacent coil below it.

25. An air intake system according to claim 23 wherein:
   (a) each coil has fewer fins per inch than a next adjacent coil below it.

26. An air intake system according to claim 23 wherein:
   (a) the coils are upstream of the inlet arrangement.

27. An air intake system according to claim 23 wherein:
   (a) the coils are downstream of the inlet arrangement.

28. An air intake system according to claim 23 wherein:
   (a) each coil is one of a cooling coil or a heating coil; and
   (b) the inlet arrangement includes a plurality of filters operably oriented to remove at least some debris from the air.

* * * * *